(12) United States Patent
Rudenko et al.

(10) Patent No.: US 10,749,173 B2
(45) Date of Patent: Aug. 18, 2020

(54) PROCESS FOR THE PREPARATION OF LITHIUM TITANIUM SPINEL AND ITS USE

(71) Applicant: Johnson Matthey Public Limited Company, London (GB)

(72) Inventors: Stefanie Rudenko, Hallbergmoos (DE); Manuel Pfanzelt, Ulm (DE); Andreas Laumann, Munich (DE)

(73) Assignee: Johnson Matthey Public Limited Company, London (GB)

( * ) Notice: Subject to any disclaimer, the term of this patent is extended or adjusted under 35 U.S.C. 154(b) by 86 days.

(21) Appl. No.: 16/192,436

(22) Filed: Nov. 15, 2018

(65) Prior Publication Data

US 2019/0097224 A1    Mar. 28, 2019

Related U.S. Application Data

(62) Division of application No. 14/896,458, filed as application No. PCT/EP2014/001451 on May 28, 2014, now Pat. No. 10,170,758.

(30) Foreign Application Priority Data

Jun. 5, 2013   (EP) .................................. EP13170658

(51) Int. Cl.
    *H01M 4/485*   (2010.01)
    *H01M 4/131*   (2010.01)
    (Continued)

(52) U.S. Cl.
    CPC .......... *H01M 4/485* (2013.01); *C01G 23/005* (2013.01); *H01M 4/131* (2013.01);
    (Continued)

(58) Field of Classification Search
    None
    See application file for complete search history.

(56) References Cited

U.S. PATENT DOCUMENTS

| 5,545,468 A | 8/1996 | Koshiba et al. |
| 7,368,097 B2 | 5/2008 | Sterzel |

(Continued)

FOREIGN PATENT DOCUMENTS

| DE | 10319464 | 11/2004 |
| DE | 102008050692 | 4/2010 |

(Continued)

OTHER PUBLICATIONS

Bruce et al., Nanomaterials for Rechargeable Lithium Batteries, Agnew. Chem. Int. Ed., (2008), vol. 47, pp. 2930-2946.

(Continued)

*Primary Examiner* — Christopher P Domone
(74) *Attorney, Agent, or Firm* — BakerHostetler

(57) ABSTRACT

The present invention relates to a composite oxide with x wt.-parts $Li_2TiO_3$, preferably in its cubic modification of space group Fm-3m, t wt.-parts $TiO_2$, z wt.-parts of $Li_2CO_3$ or LiOH, u wt.-parts of a carbon source and optionally v wt.-parts of a transition or main group metal compound and/or a sulphur containing compound, wherein x is a number between 2 and 3, y is a number between 3 and 4, z is a number between 0.001 and 1, u is a number between 0.05 and 1 and $0 \leq v < 0.1$ and the metal of the transition or main group metal compound is selected from Al, Mg, Ga, Fe, Co, Sc, Y, Mn, Ni, Cr, V or mixtures thereof. Further the present invention relates to the use of the composite oxide in a process for the preparation of a composition of a non-doped and doped lithium titanate $Li_4Ti_5O_{12}$ comprising secondary agglomerates of primary particles and its use as anode material in secondary lithium-ion batteries.

11 Claims, 5 Drawing Sheets

Figure 1:
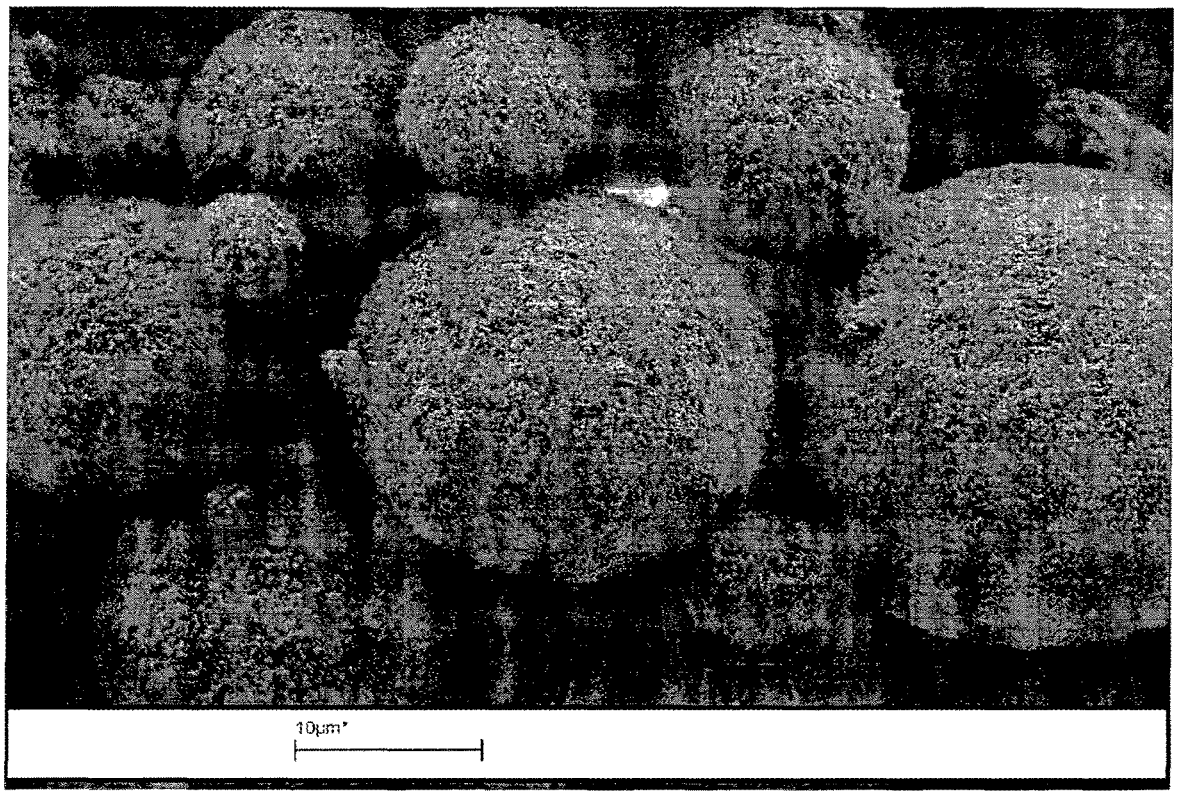

(51) Int. Cl.
*H01M 10/0525* (2010.01)
*C01G 23/00* (2006.01)
*H01M 4/02* (2006.01)

(52) U.S. Cl.
CPC ..... *H01M 10/0525* (2013.01); *C01P 2002/52* (2013.01); *C01P 2002/54* (2013.01); *C01P 2002/72* (2013.01); *C01P 2004/03* (2013.01); *C01P 2004/50* (2013.01); *C01P 2004/52* (2013.01); *C01P 2006/12* (2013.01); *H01M 2004/027* (2013.01)

(56) References Cited

U.S. PATENT DOCUMENTS

| | | | |
|---|---|---|---|
| 8,168,150 | B2 | 5/2012 | Hemmer et al. |
| 9,085,491 | B2 | 7/2015 | Dollinger et al. |
| 9,187,336 | B2 | 11/2015 | Holzapfel et al. |
| 2004/0202934 | A1* | 10/2004 | Zaghib .................. B82Y 30/00 429/231.1 |
| 2011/0189545 | A1* | 8/2011 | Holzapfel ............. C01G 23/005 429/231.1 |
| 2014/0038058 | A1 | 2/2014 | Holzapfel et al. |
| 2014/0312269 | A1 | 10/2014 | Laumann et al. |

FOREIGN PATENT DOCUMENTS

| | | |
|---|---|---|
| DE | 102011012713 | 9/2012 |
| DE | 102012000914 | 11/2012 |
| EP | 1057783 | 12/2000 |
| EP | 1722439 | 11/2006 |
| JP | 2002151082 | 5/2002 |
| JP | 2012121803 | 6/2012 |
| WO | WO 200283555 | 10/2002 |
| WO | WO 2009146904 | 12/2009 |
| WO | WO 2009147854 A1 | 10/2011 |
| WO | WO 2010137582 A1 | 11/2011 |
| WO | WO 2012117023 | 9/2012 |
| WO | WO 2011078112 A1 | 5/2013 |
| WO | WO 2013107861 | 7/2013 |

OTHER PUBLICATIONS

Dokko et al., "Preparation of Micro-Dot Electrodes of LiCoO2 and Li4Ti5O12 for Lithium Micro-Batteries," Electrochimica Acta 51 (2005), pp. 966-971.

Ernst et al., "Electrochemically Active Flame-Made Nanosized Spinels LiMn2O4, LiTi5O12 and LiFe5O8," Materials Chemistry and Physics (2007), 101 (2-3) pp. 372-378.

He et al., "Spherical Li4Ti5O132 Synthesized by Spray Drying From a Different Kind of Solution," Journal of Alloys and Compounds, (2012) 540, pp. 39-45.

Huang et al., "Preparation and Electrochemical Performance of Ag Doped Li4Ti5O12," Electrochemistry Communication, (2004) vol. 6, pp. 1093-1097.

Huang et al., Effects of Dopant on the Electrochemical Performance of Li4Ti5O12 as Electrode Material for Lithium Ion Batteries, Journal of Power Sources 165 (2007), pp. 408-412.

Jiang et al., "Effect of Particle Dispersion on High Rate Performance of Nano-sized Li4Ti5O12 Anode," Electcrochimica Acta 52 (2007), pp. 6470-6475.

Kalbec et al., "Phase-Pure Nanocrystalline Li4Ti5O12 for a Lithium-Ion Battery," Journal of Solid State Electrochemistry (2003), 8(1) pp. 2-6.

Yan et al., "A New Hydrothermal Synthesis of Spherical Li4Ti5O12 Anode Material for Lithium-Ion Secondary Batteries," Journal of Power Sources 219 (2012), pp. 45-51.

* cited by examiner

PROCESS FOR THE PREPARATION OF LITHIUM TITANIUM SPINEL AND ITS USE

CROSS REFERENCE TO RELATED APPLICATIONS

This application is a divisional of U.S. patent application Ser. No. 14/896,458 filed Dec. 7, 2015, which is a National Stage Application filed under 35 U.S.C. § 371 of International Application No. PCT/EP2014/001451 filed May 28, 2014, which claims priority to EP Application No. 13170658.2, filed Jun. 5, 2013. All of the above referenced applications are incorporated in their entireties by reference herein for any and all purposes.

DETAILED DESCRIPTION OF ILLUSTRATIVE EMBODIMENTS

The present invention relates to a composite oxide containing $Li_2TiO_3$, $TiO_2$, LiOH and/or $Li_2CO_3$ and a carbon source with optionally a transition or main group metal compound and/or a sulphur containing compound and its use for the preparation of doped and undoped lithium titanate $Li_4Ti_5O_{12}$.

Rechargeable lithium-ion batteries are key components in many electronic devices and in mobile and stationary applications because of their high-energy storage density and ambient temperature operation. The use of lithium titanate $Li_4Ti_5O_{12}$, or lithium titanium spinel for short, as a substitute for graphite as anode material in rechargeable lithium-ion batteries was proposed some time ago.

A current overview of anode materials in such batteries can be found e.g. in P. G. Bruce et al., Angew. Chem. Int. Ed. 47, 2930-2946 (2008).

The advantages of $Li_4Ti_5O_{12}$ compared with graphite are in particular its better cycle stability, its better thermal rating and the higher operational reliability. $Li_4Ti_5O_{12}$ has a relatively constant potential difference of 1.55 V compared with $Li/Li^+$ and achieves several 1000 charge/discharge cycles with a loss of capacity of <20%. The material accommodates Li with a theoretical capacity of 175 $mAhg^{-1}$ and shows an excellent capacity maintenance ratio of 99% even after 100 deep discharge cycles. The structure of the parent spinel remains unaffected (a so-called "zero-strain material") during charge-discharge cycling.

Lithium titanate has a clearly more positive potential than graphite which has previously usually been used as anode in rechargeable lithium-ion batteries.

The higher potential also results in a lower voltage difference. Together with a reduced capacity of 175 mAh/g compared with 372 mAh/g (theoretical value) of graphite, this leads to a clearly lower energy density compared with lithium-ion batteries with graphite anodes.

Considering recent discussions on safety of lithium-ion batteries, one of the most important advantages of lithium titanate compared with graphite is its safety. Graphite shows an exothermal reaction when heated to high temperatures, which means that in case of fire, batteries with graphite as active anode material, release additional energy and heat which may cause high damage and even a so-called thermal runaway of the entire battery system.

Graphite has a potential of about 0.2 V vs. Li, which might drop to a potential around 0 V at low temperatures, especially below 0° C. At such low potential, Li-dendrites are likely to form. Li-dendrites are a potential risk for lithium-ion batteries, as theses dendrites can grow through the separator and might then cause self-discharge or even worse a short-circuit of the lithium-ion battery.

Moreover, $Li_4Ti_5O_{12}$ is non-toxic and is therefore also not to be classified as posing a threat to the environment.

Recently, $LiFePO_4$ has been used as cathode material in lithium-ion batteries, with the result that a voltage difference of 2 V can be achieved in a combination of $Li_4Ti_5O_{12}$ and $LiFePO_4$.

Various aspects of the preparation of lithium titanate $Li_4Ti_5O_{12}$ are described in detail. Usually, $Li_4Ti_5O_{12}$ is obtained by means of a solid-state reaction between a titanium compound, typically $TiO_2$, and a lithium compound, typically $Li_2CO_3$, at high temperatures of over 800° C. (U.S. Pat. No. 5,545,468 and EP 1 057 783 A2)). This high-temperature calcining step appears to be necessary in order to obtain relatively pure, satisfactorily crystallized $Li_4Ti_5O_{12}$, but this causes the disadvantage that primary particles are obtained which are too coarse and a partial fusion of the material occurs. The product obtained in this way must therefore be ground extensively, which may lead to further impurities.

Sol-gel processes for the preparation of $Li_4Ti_5O_{12}$ are also described (DE 103 19 464 A1). In these, organotitanium compounds, such as for example titanium tetraisopropoxide or titanium tetrabutoxide, are reacted in anhydrous media with for example lithium acetate or lithium ethoxide to produce $Li_4Ti_5O_{12}$. However, the sol-gel methods require the use of titanium starting compounds that are far more expensive than $TiO_2$ and the titanium content of which is lower than in $TiO_2$, with the result that preparing a lithium titanium spinel by means of the sol-gel method is usually uneconomical, in particular as the product still has to be calcined after the sol-gel reaction in order to achieve crystallinity.

In addition, preparation processes by means of flame spray pyrolysis are proposed (F. O. Ernst et al. Materials Chemistry and Physics, 101 (2-3), 372-378 (2007)) as well as so-called "hydrothermal processes" in anhydrous media (M. Kalbac et al., Journal of Solid State Electrochemistry, 8(1), 2-6 (2003)).

Further possibilities are described in WO 2009/146904 and more recently by H. Yan et al. Journal of Power Sources 219, 45-51 (2012) by using hydrothermal synthesis routes. Z. He et al. Journal of Allows and Compounds 540, 39-45 (2012) propose spray drying of a lithium titanium peroxide precursor to obtain lithium titanate with good electric properties.

Furthermore, in addition to the preparation of non-doped $Li_4Ti_5O_{12}$, the preparation and properties of Al-, Ga- and Co-doped $Li_4Ti_5O_{12}$ has also been described (S. Huang et al. J. Power Sources 165, 408-412 (2007)).

It was therefore a need to provide an alternative preparation process for non-doped and doped lithium titanate which in particular makes the preparation of phase-pure non-doped or doped lithium titanate possible. Furthermore, it is object of the present invention to provide a process comprising few steps which can be conducted easily. The process makes use of a specific intermediate as starting material which is also part of the present invention.

More specifically the intermediate is a composite oxide with x wt.-parts $Li_2TiO_3$, preferably in its cubic crystal structure of space group Fm-3m, y wt.-parts $TiO_2$, z wt.-parts of $Li_2CO_3$ and/or lithium hydroxide, u wt.-parts of a carbon source and optionally v wt.-parts of a transition or main group metal compound and/or sulphur containing compound, wherein x is a number between 2 and 3, y is a number between 3 and 4, z is a number between 0.001 and 1, u is a number between 0.05 and 1 and 0≤v≤0.1 and the metal of the transition or main group metal compound is selected from Al, Mg, Ga, Fe, Co, Sc, Y, Mn, Ni, Cr, V or mixtures thereof.

The $TiO_2/Li_2TiO_3$ wt. ratio is preferably in a range from 1.3 to 1.85, in other embodiments from 1.41-1.7, and more preferably from 1.41-1.51.

The stoichiometric ratio of $TiO_2$ to $Li_2TiO_3$ in the composite oxide is in the approximate range of the theoretical stoichiometric value of ~1.5, which is due in particular to the volatility of the lithium starting compound under the chosen reaction conditions, in order to obtain a phase-pure product (e.g. Dokko et. al. Elektrochimica Acta 51, 966-971 (2005), Jiang et. al. Electrochimica Acta 52, 6470-6475(2007), Huang et. al. Electrochem. Comm. 6, 1093 97(2004)).

Under the specific reaction conditions as mentioned below, the $Li_2TiO_3$ is present in its cubic crystal structure (space group Fm-3m). The cubic form starts transforming to the monoclinic structure above 300° C., whereas the fully ordered monoclinic structure is reached between 800 and 900° C. It has been found that only the use of the cubic form yields the desired end product, i.e. the lithium titanate in pure form when reacted as explained further below.

Preferably, a small excess of the lithium compound is used, quite particularly from approximately 1-5%, more preferably 2-4.5%, in certain embodiments 3±0.2% compared with the theoretical value. A small deficit of the lithium compound is less preferred, but the precise value also often depends on the reactivity of the $TiO_2$ starting product which can vary from one manufacturer to another.

If the composite oxide is used in the preparation of non-doped lithium titanium spinels, the composite oxide consists only of $Li_2TiO_3$, $TiO_2$, $Li_2CO_3$ and/or lithium hydroxide and a carbon source in the above described proportions.

The term "composite oxide" means according to the invention that the constituents of the composite oxide form a completely homogeneous "mixture" (a composite) which is achieved by a chemical and/or thermal treatment. The term "composite oxide" according to the invention is therefore not used for the purely mechanically prepared dry mixtures of the corresponding constituents, since completely homogeneous mixtures cannot usually be obtained mechanically.

The problem underlying the present invention is further solved by a process for the preparation of such a composite oxide comprising the steps of
a) providing an aqueous solution of a lithium source,
b) reacting the aqueous solution by adding solid $TiO_2$ and a carbon source to form a slurry at a temperature in the range from 120-180° C.
c) spray-drying the slurry and collecting the composite oxide One embodiment of the present invention is using LiOH as lithium source. Lithium hydroxide can be used in its anhydrous or in the monohydrate form, and will be simplified in the following as LiOH.

Besides LiOH, it is also possible to use $Li_2O$ or lithium salts of organic acids like lithium acetate, lithium formate, lithium maleate, lithium methanolate, lithium citrate etc. During spray-drying, all these lithium salts will react to lithium carbonate and/or LiOH, depending on the spray drying conditions. The lithium salts of organic acids further provide a simple source for carbon as being a lithium source and a carbon precursor at the same time. In this case, the lithium salts of organic acids may be used alone or in corresponding amounts together with LiOH and/or $Li_2O$.

Lithium sulphate may act as lithium source and as a source for sulphur in the form of sulphate as well. This is in that case preferable, when the final product shall be a lithium titanate doped with sulphate.

The carbon source is selected from elemental carbon or a carbon precursor. As elemental carbon, graphite, carbon black, Ketjen Black, acetylene black, carbon nanotubes, vapour grown carbon fibers (VGCF) etc. may be used. In specific embodiments, graphite may be preferred.

Carbon precursors are typically carbon-containing compounds which may decompose when exposed to a heat treatment to a carbonaceous residue. Representative non limiting examples of such a carbon containing compound are e.g. starch, maltodextrin, gelatine, a polyol, a sugar such as mannose, fructose, sucrose, lactose, glucose, galactose, a partically water-soluble polymer such as e.g. polyacrylate, lithium, citrate, citric acid or other organic acids and mixtures thereof. As mentioned above, lithium salts of organic acids may be used as well. Surprisingly it was found that the presence of the carbon source confers to the composite a better processability, i.e. flowability than without the presence of a carbon source.

An advantage of the process according to invention is that a filtration of the slurry like in WO2009/146904 is avoided. The obtained composite according to step b) of the present invention is directly supplied to step c) of the present invention thus there is no waste water which facilitates the large scale synthesis. The solids content of the slurry before spray drying is in the range of 10-25 wt %, preferably 17-25 wt. %.

Surprisingly it was found that the crystal phase of the titanium dioxide used in the process has no effects on the product of the composite oxide. More surprisingly also not on the final product when the composite oxide according to the invention is used for the preparation of phase-pure spinel.

The titanium oxide may therefore be used either in its anatase or rutile phase but also in some embodiment of the invention in its amorphous form.

The reaction takes typically place over a period of 1 to 20 hours, preferably 8-15 hours.

If, in the subsequent thermal reaction of the composite oxide, a doped lithium titanium spinel is to be prepared therefrom, a corresponding transition metal or main group metal compound and/or sulphur containing compound, in particular a compound of Al, Mg, Ga, Fe, Co, Sc as well as Y, Mn, Ni, Cr, V can be added either before the addition of the $TiO_2$ or at the same time as the addition of the $TiO_2$. Typical compounds are the oxides, hydroxides, salts of organic acids like acetates, formiates, oxalates, maleates, and in some embodiments the sulphates of the aforementioned metals and transition metals.

In the latter case, that is in the case of simultaneous addition, the corresponding metal oxide is preferably used. If the metal compound is already present before the addition of the $TiO_2$ in solution together with the LiOH, either a soluble metal compound, such as an acetate, which reacts to produce hydroxide or oxide at reaction temperature can be used or a suspension of the corresponding metal oxide. It is understood that several different metal oxides or metal compounds of the above-named metals can of course also be added, in order for example to then obtain mixed-doped lithium titanium spinels. In these cases, the composite oxide according to the invention therefore contains, further other appropriate metal compounds, in particular oxides of the afore-named doping metals.

An alternative embodiment of the present invention is the preparation of lithium titanium spinel doped with at least sulphur. The doping with sulphur is performed by using $Li_2SO_4$ as one of the lithium sources and/or sulphates of the aforementioned transition metals or main group metals.

It is further particularly advantageous that the aqueous lithium source solution is kept at a temperature of 120-180° C. during the reaction in step b), since this particularly encourages the reaction of the educts to produce the composite oxide according to the invention containing $Li_2TiO_3$ in cubic form and $TiO_2$. If the temperature is too low, impurities may occur in the end-product.

Before or during step b) a main group metal or transition metal compound containing Al, Mg, Ga, Fe, Co, Sc, Y, Mn, Ni, Cr, V and/or a sulphur containing compound or mixtures thereof is added for the preparation of doped lithium titanate compounds.

The composite oxide according to the invention may be used in a process for the preparation of a composition of phase-pure doped or non doped lithium titanate $Li_4Ti_5O_{12}$ wherein the composite oxide is sintered at a temperature of ≤780° C., preferably ≤750° C. and in some embodiments ≤735° C. The process is therefore also a further object of the present invention.

The composition according to the invention comprises secondary agglomerates of primary particles and primary particles, wherein the primary particles form 1-40 vol % of the composition and the secondary agglomerates form 99-60 vol %. More preferred is a ratio of 1-5% of primary particles and 95-95% of secondary agglomerates. In this case, the composition shows a narrow, essentially monomodal particle size distribution.

The term "narrow" means in the present invention the distance between the $D_{10}$-values and the $D_{90}$-values of the secondary agglomerates in the range of 8 μm to 30 μm. The $D_{10}$-values give here the values of which 10 volume-% of the particles in the measured samples have smaller or the same particle diameter. The $D_{90}$-values give here the values of which 90 volume-% of the particles in the measured samples have smaller or the same particle diameter.

The sintering time is 1 to 15 hours, in some embodiments 1 to 7 hours. It was surprisingly found that the use of the composite oxide of the present invention simple solid state process lithium titanate essentially monomodal narrow particle size yields in a very $Li_4Ti_5O_{12}$ with an distribution at comparatively low sintering temperatures. Typical solid state processes for the synthesis of lithium tanates comprising sintering of $TiO_2$ and a lithium source require reaction temperatures of typically higher than 800° C. (EP 1722 439 A1).

In principle, it is possible according to the invention to set the ratio of the components of the composite oxide to each other in such a way that typically all lithium titanium spinels of the type $Li_{1+x}Ti_{2-x}O_4$ with 0≤x≤⅓ of the space group Fd-3m and generally also any mixed lithium titanium oxides of the generic formula $Li_xTi_yO$ (0<x, y<1) can be obtained in the subsequent thermal reaction.

A still further object of the present invention is therefore a composition of phase-pure doped or non doped lithium titanate $Li_4Ti_5O_{12}$ in the form of fine particles obtainable by the process according to the invention. The composition comprises two different types of particles, namely secondary agglomerates of primary particles and primary particles. The particles of the composition have a monomodal particle size distribution. The primary particles form from 1-40 vol % of the composition and the secondary agglomerates from 99-60 vol %.

A further advantage compared to lithium titanates of the prior art is the improved flowability of the product obtained according to the process of the invention. The flow rate index (FRI) (Johanson, Pharmaceutical Manufacturing, Sterling publishers 1995) is 15% higher compared to a product obtained according to EP 1722 439 A1 and according to WO2009/146904.

Surprisingly, the lithium titanate composition according to the invention has a monomodal particle size distribution compared to the lithium titanate prepared according to WO2009/146904, where in a similar process, the slurry for the preparation of the intermediate composite oxide was filtered and dried, but not directly spray dried.

The lithium titanate composition invention has an extremely small leads to the current density in obtained according to the primary particle size which an anode that contains the lithium titanate composition according the invention being particularly high and wherein this anode further has a high cycle stability.

It was surprisingly found that, unlike all previous solid-state synthesis processes for lithium titanate, a much lower temperature and also a much shorter reaction time can be applied and yet the disadvantages of the state of the art, in particular the occurrence of further reaction products and phases, can be avoided and pure lithium titanate is obtained as a composition of particles.

When preparing a composition of doped lithium titanate, it is to be borne in mind that, in addition to the reaction according to the invention of a composite oxide already containing a doping-metal compound or a doping-metal oxide and/or a sulphur containing compound, the compound of the doping metal and/or sulphur containing compound may also be added after the synthesis of the (non-doped) lithium titanium spinel or also of the composite oxide in solid or liquid form (e.g. steeping) and then heated or calcined anew.

In contrast to the present invention, a purely mechanical mixture consisting e.g. of $Li_2TiO_3$ and $TiO_2$ must be sintered at temperatures of higher than 800-850° C., wherein different phases and products are obtained.

Typically, with the process according to the invention, the sintering time is 1 to 20 hours, or even shorter as discussed before and is thus clearly shorter than with conventional solid-state processes or compared with a purely mechanical stoichiometric mixture for example of the two starting compounds $Li_2TiO_3$ and $TiO_2$. The sintering is done in an oven known essentially to a person skilled in the art, preferably 20 in a rotary kiln or in a chamber kiln (or batch furnace).

Within the scope of the present invention, the addition of strong bases during the total synthesis of lithium titanate can be advantageously avoided, since in the first synthesis step when preparing the composite oxide according to the invention, LiOH is used as lithium source which acts as a base or "activator".

Thus, a total synthesis of doped or non-doped lithium titanate can be provided without using strong and also corrosive bases, such as NaOH or KOH, which are indispensable in most of the above-mentioned wet-chemical or hydrothermal processes in the prior art. Moreover, sodium or potassium impurities can be thus avoided in the final product.

As already stated above, it was surprisingly found that the necessary temperatures in the calcining step which leads to the phase-pure lithium titanate $Li_4Ti_5O_{12}$ according to the invention are very low compared with the temperatures used in the prior art. Compared with temperatures of more than 800-850° C. of the prior art, according to the invention temperatures of only ≤780° C., preferably ≤750° C. can be used. Also this temperature avoids the phase transition of $Li_2TiO_3$ at higher temperatures (vide supra) which may lead to further unwanted phases and byproducts. For example, a clean product was already obtained after 15 hours reaction time at a temperature of only 700° C.

A further advantage of the process according to the invention compared with the usual solid-state synthesis routes for the preparation of lithium titanium spinels is further that a calcining with only very small amounts of LiOH or $Li_2CO_3$ can be carried out. Both compounds used typically in prior art processes are highly reactive and corrosive at the high temperatures of more than 850° C. and thus strongly attack the walls of the reactors in which the calcining takes place. With the composite oxide used according to the invention, no reaction with the materials of the reactors takes place.

The term "lithium titanate" or "lithium titanate according to the invention" here refers to both the non-doped and the doped forms and may also be used for "lithium titanate composition".

Quite particularly preferably, the lithium titanate composition according to the invention is phase-pure. The term "phase-pure" or "phase-pure lithium titanate" means according to the invention that only residuals of rutile, anatase or $Li_2TiO_3$ in an amount of <3% are detectable via XRD.

The lithium titanate composition according to the invention comprises secondary agglomerates of primary particles. This is surprising since in a typical solid state reaction in the prior art, no particles form such about agglomerates are 1-40 vol % of the formed. The composition primary with an average size ($D_{50}$) of about 150 nm, preferably 1-5 vol %. The secondary agglomerates form about 99-60 vol %, preferably 99-95 vol % of the composition with an average size ($D_{50}$) of about 10 μm. Further they have a narrow particle size distribution, preferably a monomodal size distribution.

As already stated, a small primary particle size leads to a higher current density and also to a better cycle stability and a lower polarization of the lithium titanate composition according to the invention when used as active anode material. Therefore, the lithium titanate composition can also be used particularly advantageously as an active material of an anode in rechargeable lithium-ion batteries without further mechanical grinding steps. Of course, the product obtained can also be ground even more finely, should this be necessary for a specific use. The grinding procedure is carried out with methods known per se to a person skilled in the art.

Surprisingly, it was also found that the lithium titanate composition obtained doped and non-doped according to the invention has a relatively high BET surface area in the range from 2-15 $m^2/g$.

In further embodiments of the invention, the lithium titanate according to the invention is doped with at least one further element, which leads to a further increase in stability and cycle stability when the doped lithium titanate composition is used as an active material in an anode. In particular, this is achieved by the incorporation of additional ions, more preferably Al, Mg, Ga, Fe, Co, Sc, Y, Mn, Ni, Cr, V, S or several of these ions, into the lattice structure. Aluminum is quite particularly preferred. The doped lithium titanium spinels are typically also phase-pure, as described above.

The doping metal (or non metal) ions which can sit on lattice sites of wither the titanium or the lithium present in a quantity of 0.05 to 3% by weight, preferably 1-3% by weight, relative to the total spinel.

The phase-pure doped or non-doped lithium titanate composition according to the invention may be used as already stated above as an active anode material for secondary lithium-ion batteries.

A further object of the present invention is therefore further a secondary lithium-ion battery, comprising an anode and a cathode as well as an electrolyte, wherein the anode contains non-doped or doped lithium titanate $Li_4Ti_5O_{12}$ according to the invention as one active material. The anode of such a battery has a specific charge/discharge capacity of >160 Ah/kg.

In principle, it may be possible according to the invention to set the ratio of the components of the composite oxide to each other in such a way that typically all lithium titanium spinels of the type $Li_{1+x}Ti_{2-x}O_4$ with $0 \leq x \leq \frac{1}{3}$ of the space group Fd-3m and generally also any mixed lithium titanium oxides of the generic formula $Li_xTi_yO$ (0<x, y<1) can be obtained in the subsequent thermal reaction.

Figure 2:
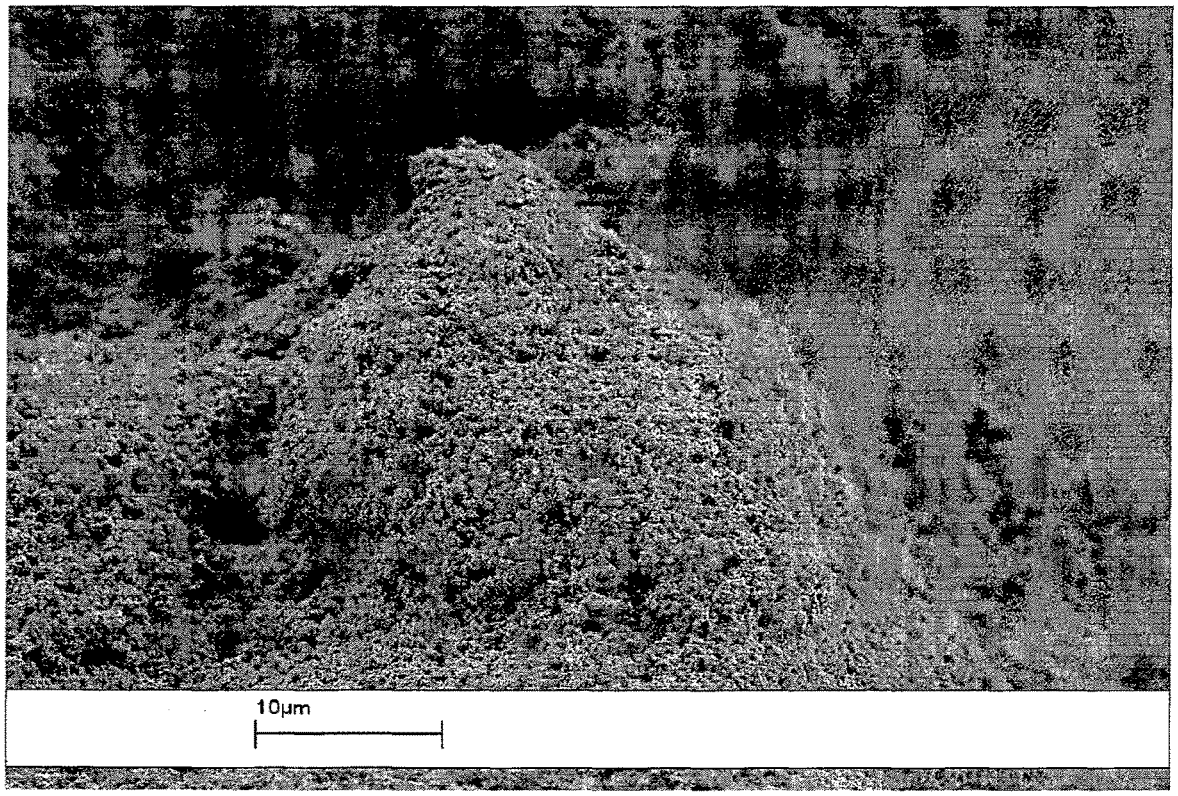
Figure 3:
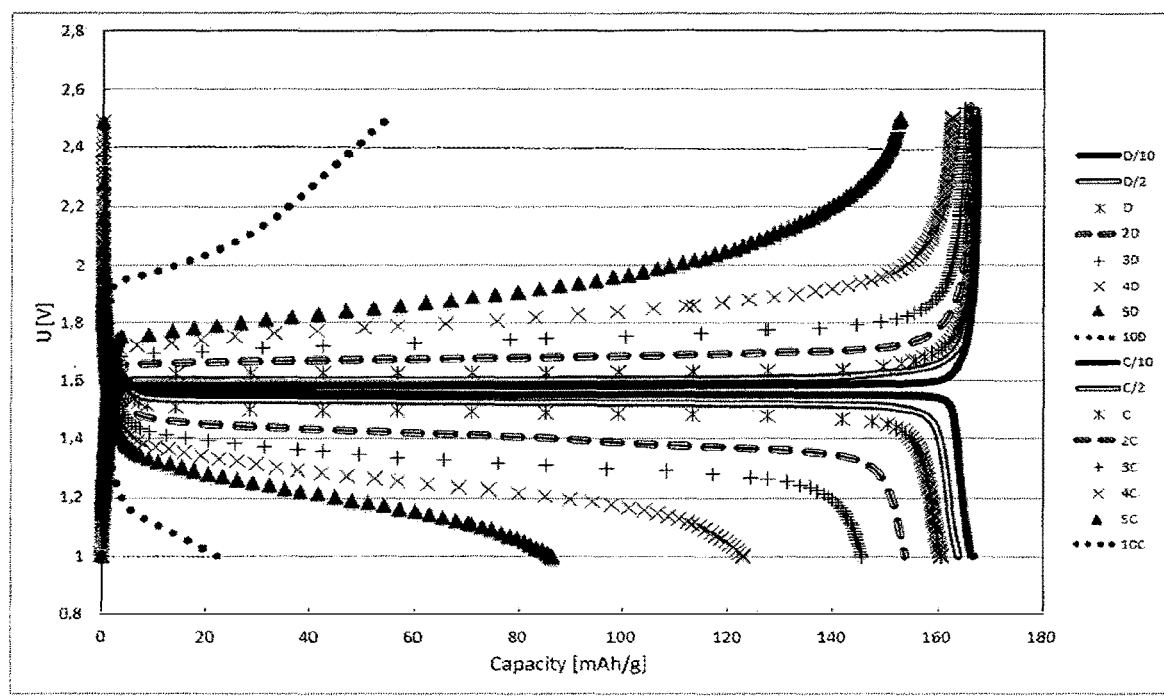
Figure 4:
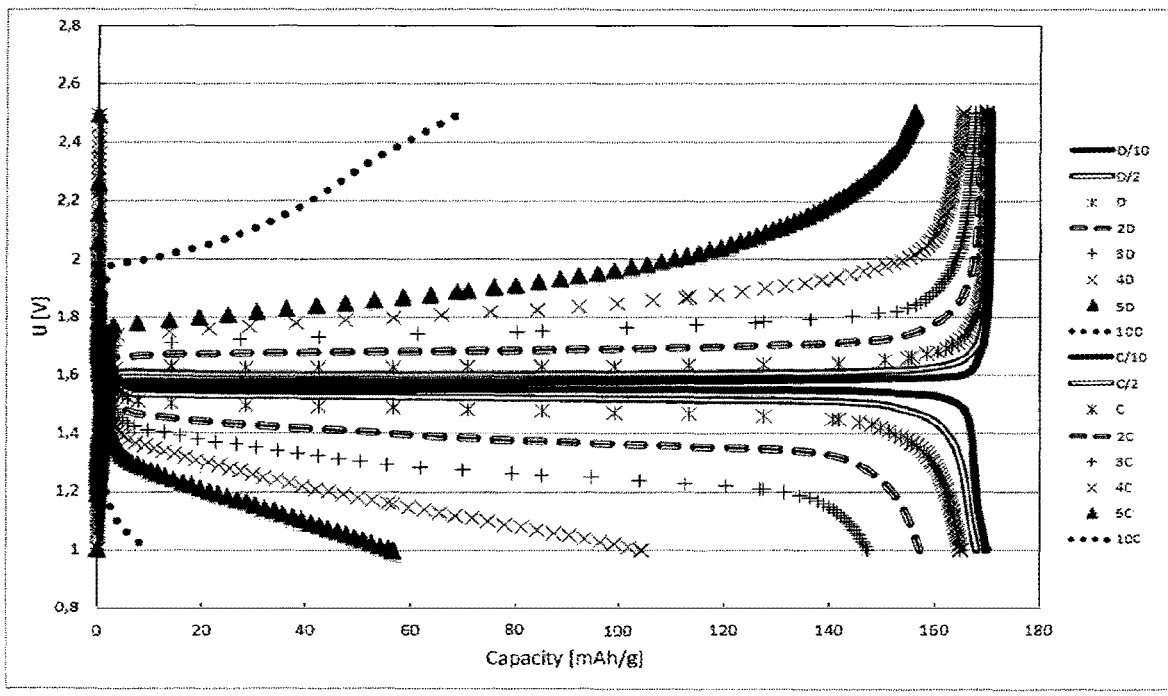
Figure 5:
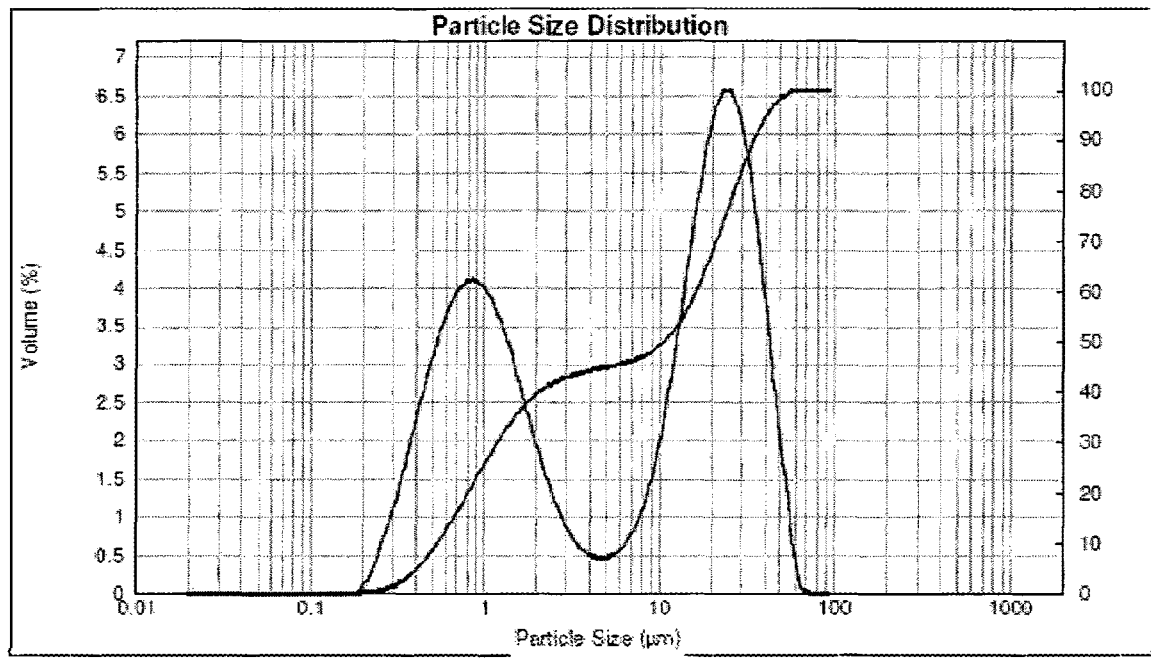
Figure 6:
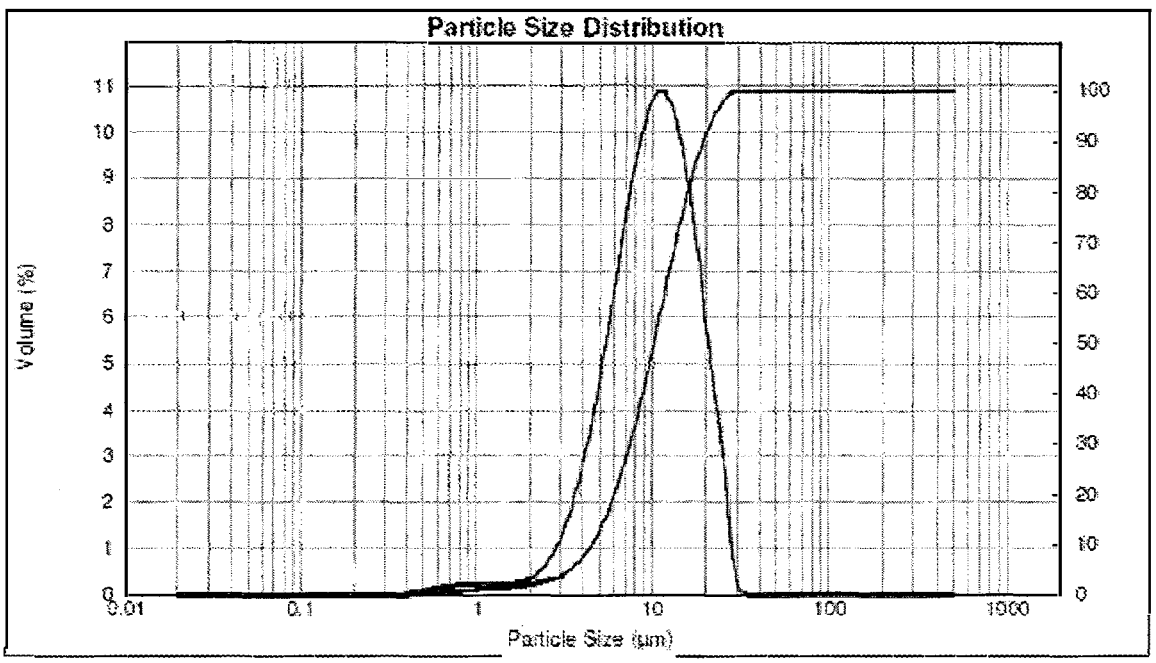
Figure 7A:
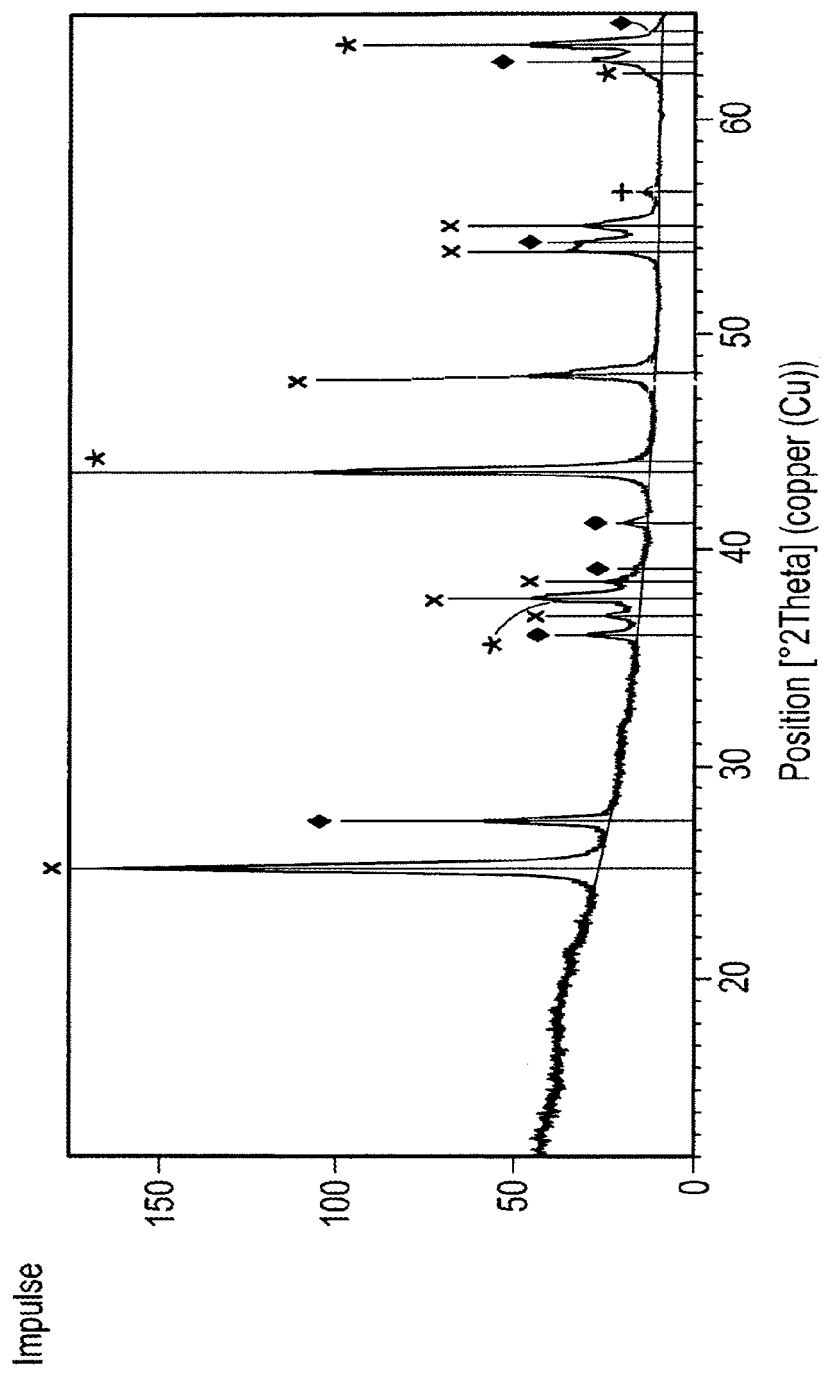
Figure 7B:
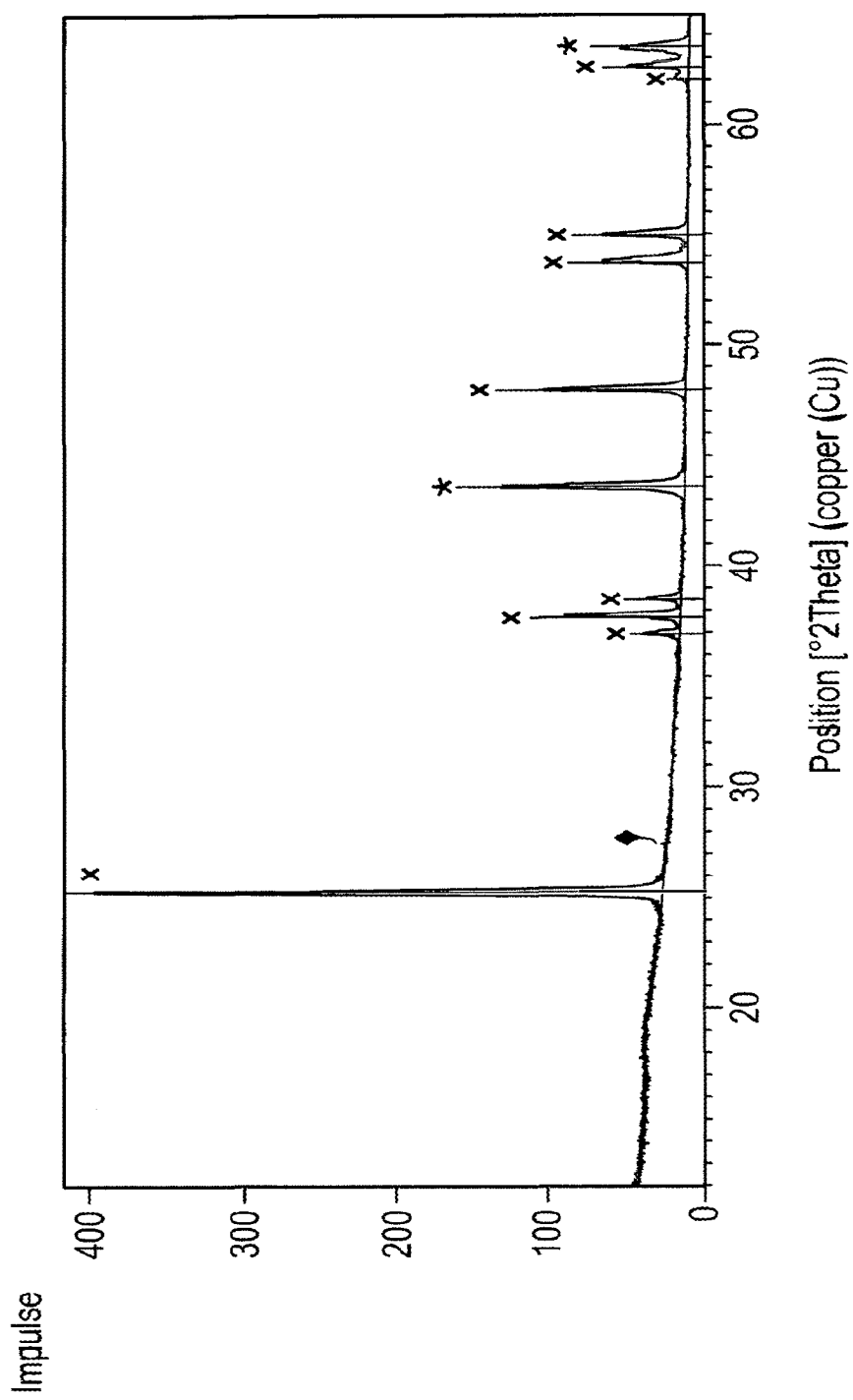

The invention is described in more detail below with reference to drawings and examples which are not, however, to be considered as limiting for the scope of the invention. It is shown in:

FIG. 1 a SEM micrograph of the lithium titanate composition according to the invention, FIG. 2 a SEM micrograph of lithium titanate of prior art, FIG. 3 charge-discharge cycles of an anode containing lithium titanate of prior art as active material, FIG. 4 charge-discharge cycles of an anode containing lithium titanate of the invention as active material, FIG. 5 the particle-size distribution of a lithium titanate of prior art, FIG. 6 the particle-size distribution of a lithium titanate according to the invention, FIG. 7a a XRD chart of the composite oxide of the invention, and FIG. 7b another XRD chart of the composite oxide of the invention.

EXAMPLES

1. General

Determination of the particle-size distribution:

The particle-size distributions for the secondary agglomerates are determined using a light scattering method using commercially available devices. This method is known per se to a person skilled in the art, wherein reference is also made in particular to the disclosure in JP 2002-151082 and WO 02/083555. In this case, the particle-size distributions were determined by a laser diffraction measurement apparatus (Master sizer 2000 APA 5005, Malvern Instruments GmbH, Herrenberg, Del.) and the manufacturer's software (version 5.40). Measurements are performed in water with a set refractive index of 2. 200. The sample preparation and measurement took place according to the manufacturer's instructions.

The $D_{90}$ value gives the value at which 90% of the particles in the measured sample have a smaller or the same particle diameter according to the method of measurement. Analogously, the $D_{50}$ value and the $D_{10}$ value give the value at which 50% and 10% respectively of the particles in the measured sample have a smaller or the same particle diameter according to the method of measurement.

According to a particularly preferred embodiment of the invention, the values mentioned in the present description are valid for the $D_{10}$ values, $D_{50}$ values, the $D_{90}$ values as well as the difference between the $D_{90}$ and $D_{10}$ values relative to the volume proportion of the respective particles in the total volume. Accordingly, the $D_{10}$, $D_{50}$ and $D_{90}$ values mentioned herein give the values at which 10 volume-% and 50 volume-% and 90 volume-% respectively of the particles in the measured sample have a smaller or the same particle diameter. If these values are obtained, particularly advantageous materials are provided according to the invention and negative influences of relatively coarse particles (with relatively larger volume proportion) on the processability and the electrochemical product properties are avoided. Preferably, the values mentioned in the present description are valid for the $D_{10}$ values, the $D_{50}$ values, the $D_{90}$ values as well as the difference between the $D_{90}$ and the $D_{10}$ values relative to both percentage and volume percent of the particles.

The secondary particle-size distribution (of the agglomerates) of the composition according to the invention can be directly determined as follows using SEM photographs:

A small quantity of the powder composition sample is suspended in 3 ml acetone and dispersed with ultrasound for 30 seconds. Immediately thereafter, a few drops of the suspension are dropped onto a sample plate of a scanning electron microscope (SEM). The solids concentration of the suspension and the number of drops are measured so that a large single-ply layer of powder particles forms on the support in order to prevent the powder particles from obscuring one another. The drops must be added rapidly before the particles can separate by size as a result of sedimentation. After drying in air, the sample is placed in the measuring chamber of the SEM. In the present example, this is a LEO 1530 apparatus which is operated with a field emission electrode at 1.5 kV excitation voltage, an aperture of 30 µm, an SE2 detector, and 3-4 mm working distance. At least 20 random sectional magnifications of the sample with a magnification factor of 20,000 are photographed. These are each printed on a DIN A4 sheet together with the inserted magnification scale. On each of the at least 20 sheets, if possible at least 10 free visible particles of the material according to the invention, wherein the boundaries of the particles of the material according to the invention are defined by the absence of fixed, direct connecting bridges. Of each of these selected particles, those with the longest and shortest axis in the projection are measured in each case with a ruler and converted to the actual particle dimensions using particle, the arithmetic shortest axis is defined the scale ratio. For each measured particle, the arithmetic mean from the and the shortest axis is defined as particle diameter. The measured particles are then divided analogously to the light-scattering method into size classes. The differential particle-size distribution relative to the number of particles is obtained by plotting the number of the associated particles in each case against the size class. The cumulative particle-size distribution from which $D_{10}$, $D_{50}$ and $D_{90}$ can be read directly on the size axis is obtained by continually totaling the particle numbers from the small to the large particle classes.

BET measurements were carried out according to DIN-ISO 9277.

Spray drying was performed in a Nubilosa spray dryer 1.25 min diameter, 2.5 m in cylindrical height and 3.8 m in total height. The spray dryer was equipped with pneumatic nozzles type 970 form 0 S3 with an open diameter of 1.2 mm and type 15 94 0-4 3 form 0 S2 with an open diameter of 1.8 mm both of Dusen-Schlick GmbH, HutstraBe 4, D-96253 Untersiemau, Germany. Drying gas was supplied by a controlled suction fan and heated electrically before entering the spray dryer. The dried particles were separated from the gas stream by a bag filter and recovered by a pulsed jet dedusting system. Amount of drying gas, gas inlet temperature and outlet temperature were controlled by a process control system. The outlet temperature control governed the speed of the slurry feed pump. Atomization gas was supplied by the compressed air distribution of the plant and its pressure was controlled by a local pressure controller.

Calcination was performed 1500-3 of HTM Reetz GmbH, in a rotary kiln type LK 900-200-1500-3 of HTM Reetz GmbH, Köpenicker Str. 325, D-12555 Berlin, Germany. Its heated rotary tube was 150 mm in diameter and 2.5 m in length. It provided a preheating zone, three heated separately controlled temperature zones, and a cooling zone. The inclination of the tube could be adjusted and its variably controlled. The product was supplied by a controlled screw feeder. Product supply, the kiln itself and product outlet could be blanketed by nitrogen. The amount of calcined product could be continuously monitored by a balance. Besides the calcination in a rotary kiln, the calcination has also been performed in state-of-the-art batch furnaces.

2. General description of the process according to the invention for the preparation of the composite oxide according to the invention and of a lithium titanate.

2.1. Composite Oxide

The compounds used for the process according to the invention 15 for the preparation of a composite oxide are, as starting products, initially $LiOH.H_2O$ and $TiO_2$ in anatase form. A carbon source and optionally a transition or main group metal compound and/or a sulphur containing compound as defined in the foregoing of the corresponding dopant are added. The water content varies in the case of commercially available $LiOH.H_2O$ (from Merck) from batch to batch and was determined prior to the synthesis.

$LiOH.H_2O$ was initially dissolved in distilled water at temperatures between 15 and 50° C. Once the lithium hydroxide has completely dissolved, a corresponding quantity (depending on the desired end-product) of solid $TiO_2$ in anatase modification (available from Sachtleben) and graphit~(from GK Graphit Kropfühl AG) was added under constant stirring. After homogeneous distribution of the anatase, the suspension was placed in an autoclave, wherein the reaction then took place under continuous stirring at a temperature of 100° C. to 250° C., typically at 120 to 180° C. for a period of approx. 18 hours.

Parr autoclaves (Parr 4843 pressure reactor) with double stirrer and a steel heating coil were used as autoclaves.

After the end of the reaction, the composite oxide was subjected to spray drying.

The drying of the suspension/slurry was carried out at gas entry temperatures in the spray-drying apparatus of 120-500° C., usually between 200-350° C., in the present case at 210° C. The exit temperatures are in the range of 70-120° C., in the present case at 110° C. The separation of the solid product from the gas can be done with any commercially available gas-solid separation system, e.g. a cyclone, an electrostatic precipitator or a filter, preferably with a bag filter with a pulsed jet dedusting system.

2.2 Lithium Titanate

The composite oxide according to the invention was then calcined.

It was found that the composite oxide according to the invention was extremely reactive in the subsequent conversion to lithium titanate through the preceding synthesis. The reaction temperatures of conventional processes for the preparation of lithium titanate starting from a purely physical mixture e.g. of 2 parts $Li_2TiO_3$ and 3 parts $TiO_2$ are typically implemented at temperatures of >800-850° C. and reaction times of more than 15 hours.

It was further found that even at low temperatures, for example at 650° C., phase-pure products (i.e. lithium titanate) form after only 15 hours reaction time. At a temperature of for example 750° C., phase-pure lithium titanate compositions even formed from the foregoing composite oxide after only 3 hours.

Only minor particle growth during the synthesis of the phases pure lithium titanate composition compared with the starting material of the corresponding composite oxide was recorded. However, the particle size increased markedly as the calcining temperature increased.

In contrary to the invention prior art, the calcined product has not been milled. The agglomerated, or partly agglomerated product was separated from possible coarse agglomerates.

For the separation step, either a standard sieving technique of a classification technique can be used.

2.3. Examples

Example 1

$LiOH.H_2O$ was dissolved in distilled water at temperatures between 15 and 50° C. The lithium hydroxide solution has been filled in an autoclave and $TiO_2$ in anatase modification has been added under stirring. The ratio of Li/Ti ratio was in between 4/5 to 6/7. Additionally, graphite was added under constant stirring.

After homogeneous distribution of the all components, the suspension was heated to a temperature of 160° C. for approximately 12 hours.

After the end of the reaction, the composite oxide was subjected to spray drying.

The drying of the suspension/slurry was carried out at gas entry temperatures in the spray-drying apparatus between 120-250° C. The exit temperatures were in the range of 100-120° C.

After spray drying, the product was then calcined at a temperature between 760° C. and 780° C. for 2 hours.

The BET of the obtained product was 5 m2/g and the D50 was at 10.37 μm.

Example 2

Water-free LiOH was dissolved in distilled water at temperatures between 40 and 50° C. in an autoclave. 3% of the lithium hydroxide has been substituted with lithium actetate. AEROXIDE P 25 from Evonik, a TiO2 compound comprising anatase and rutile has been added under stirring as well as 0.5% of aluminum hydroxide. Lithium acetate and aluminum hydroxide were added in ratios according to the invention as carbon source and dopant. The total Li/Ti ratio was in between 4/5 to 6/7. The reaction was performed at 120° C. for approximately 18 hours.

After the end of the reaction, the composite oxide was subjected to spray drying.

The drying of the suspension was carried out at gas entry temperatures in the spray-drying apparatus of 250-350° C. The exit temperatures were in the range of 110-120° C. Afterwards, the composite oxide was sintered at a temperature of 730° C. for 3 hours and a classification technique with an AFG 100 jet mill, equipped with a static coarse sifter and a cyclone preseparator to a pure sifter device has been used for separation from coarse particles.

The BET of the final product was 10 m2/g and the $D_{50}$ was at 17.5 μm.

Example 3

LiOH was dissolved in distilled water at temperatures between 10 and 50° C. 3% of saccharose has been added under stirring, as well as $TiO_2$ in an agglomerated rutile form. The suspension was filled in an autoclave and heated under constant stirring to 180° C. for approximately 3 hours.

Before spray drying, lithium sulphate has been added as dopant. The total Li/Ti ratio was in between 4/5 to 6/7. The suspension was then spray dried at an entry temperature of 350-450° C. and an outlet temperature of 120° C.

The composite oxide was then sintered at 750° C. under nitrogen for 3 h. The material has been sieved.

The BET of the final product was 12 m²/g and the 0 50 was at 5.5 μm.

Example 4

SEM Micrographs

FIG. 1 shows a SEM micrograph of the agglomerates of a lithium titanate composition according to the invention compared to prior art lithium titanate in FIG. 2 (WO2009/146904). The particles, i.e. the agglomerates in FIG. 1 are distinctly separated from one another, smaller and more uniform in size as compared to the prior art product.

Particle Size Distribution

FIG. 6 shows measurements of the particle-size distribution of a lithium titanate composition according to the invention and which shows a markedly monomodal product. Here, the $D_{50}$ value of the secondary agglomerates is 10.22 μm the $D_{90}$ value is 19, 41 μm. The tiny fraction to the left of the peak with sizes <1 μm consists of primary particles. The product of prior art (WO2009/146904) shows a bimodal particle size distribution.

XRD-Charts of the Composition Oxides of the Present Invention

XRD charts were recorded of the composite oxide which are 10 shown in FIGS. 7a and 7b. The XRD chart of FIG. 7a shows traces of anatase (x), rutile (♦), $Li_2TiO_3$ (*) and a very small amount of $Li_2CO_3$ (+). FIG. 7b shows another XRD chart of a composite oxide obtained, showing only reflections assigned to anatase (x), small traces of rutile (♦) and $Li_2TiO_3$ (*).

Electrochemical Properties

FIGS. 3 and 4 show a graph of the cycle stability of a nondoped lithium titanate composition according to the invention in FIG. 4 (the material was calcined at 750° C. for 15 hours) as anode of a half cell compared with metal lithium and of prior art material in formulation consisted ($Li_4Ti_5O_{12}$), obtainable FIG. 3 of 90% according (WO2009/146904). The electrode formulation consisted of 90% by weight lithium titanate ($Li_4Ti_5O_{12}$), obtainable according to the process according to the invention, 5% Super P and 5% PVdF. The active-mass content of the electrode was 10 mg/cm2, which is in the typical range of commercial lithium ion batteries.

The specific charge-discharge capacity which is achieved at low rates of roughly 165 to 170 Ah/kg in FIG. 4 is close to the theoretical value and even slightly better than approximately 160-165 Ah/kg for a an anode containing lithium titanate $Li_4Ti_5O_{12}$ which was obtained to WO2009/146904.

The capacity and the cycle stability of an anode containing the $Li_4Ti_5O_{12}$ composition according to the invention as an active material in a typical half cell compared with metal lithium are remarkably good at Crate with an average decline ("fading") of the order of 0.03%/cycle.

All cycles of the test cells were operated in the range from 1.0 V-2.5 Vat 20° C.

It is shown that the lithium titanate according to the present invention has a higher capacity at C/10 as the material of the prior art. Furthermore, it is proved that the preparation process for the lithium titanate of the present invention using the composite oxide of the present invention is more economical as processes of the prior art because no filtering step is needed and no waste water is formed.

What is claimed:

1. A composite oxide with x wt.-parts $Li_2TiO_3$, y wt.-parts $TiO_2$, z wt.-parts of $Li_2CO_3$ and/or lithium hydroxide, u wt.-parts of a carbon source and optionally v wt.-parts of a transition or main group metal compound and/or a sulphur containing compound, wherein the $Li_2TiO_3$ is present in its cubic crystal structure, wherein x is a number between 2 and 3, y is a number between 3 and 4, z is a number between 0.001 and 1, u is a number between 0.05 and 1 and $0 \leq v \leq 0.1$ and the metal of the transition or main group metal compound is selected from the group consisting of Al, Mg, Ga, Fe, Co, Sc, Y, Mn, Ni, Cr, V and mixtures thereof.

2. A composite oxide according to claim 1, wherein the $TiO_2/Li_2TiO_3$ weight ratio is in a range from 1.3 to 1.85.

3. A composite oxide according to claim 1, wherein the $TiO_2/Li_2TiO_3$ weight ratio is in a range from 1.41-1.7.

4. A process for the preparation of a composite oxide according to claim 1, comprising the steps of:
a) providing an aqueous solution of a lithium source;
b) reacting the aqueous solution by adding solid $TiO_2$ and a carbon source to form a slurry at a temperature in the range from 120-180° C.; and,
c) spray-drying the slurry and collecting the composite oxide,
wherein the slurry obtained in step b) is directly supplied to step c).

5. The process according to claim 4, wherein the lithium source contains lithium hydroxide.

6. The process according to claim 4, wherein the lithium source is a lithium salt of an organic acid.

7. The process according to claim 4, wherein the lithium source is $Li_2SO_4$.

8. The process according to claim 4, wherein the carbon source is selected from elemental carbon or a carbon precursor.

9. The process according to claim 4, wherein the reaction takes place over a period of 1 to 20 hours.

10. The process according to claim 4, wherein before or during step b) a transition or main group metal compound containing Al, Mg, Ga, Fe, Co, Sc, Y, Mn, Ni, Cr, V or a sulphur containing compound or mixtures thereof is added.

11. The process according to claim 4, wherein the solids content of the slurry before spray drying is in the range of 10-25 wt. %.

* * * * *